US008983993B2

(12) United States Patent
Senart et al.

(10) Patent No.: US 8,983,993 B2
(45) Date of Patent: Mar. 17, 2015

(54) DATA WAREHOUSE QUERIES USING SPARQL

(71) Applicant: SAP AG, Walldorf (DE)

(72) Inventors: Aline Senart, Le Bar sur Loup (FR); Corentin Follenfant, Antibes (FR); Anne-Elisabeth Gazet, Antibes (FR)

(73) Assignee: SAP SE, Walldorf (DE)

( * ) Notice: Subject to any disclaimer, the term of this patent is extended or adjusted under 35 U.S.C. 154(b) by 149 days.

(21) Appl. No.: 13/718,190

(22) Filed: Dec. 18, 2012

(65) Prior Publication Data

US 2014/0172780 A1 Jun. 19, 2014

(51) Int. Cl.
*G06F 17/30* (2006.01)
(52) U.S. Cl.
CPC ................................ *G06F 17/30592* (2013.01)
USPC ............ 707/763; 707/604; 707/605; 707/606
(58) Field of Classification Search
CPC .................... G06F 17/30592; G06F 17/30864; G06F 17/30017; G06F 17/30011; G06F 17/30557; G06F 17/3053; G06F 17/30867; G06F 17/30979; G06F 17/30442; G06F 17/30607; G06F 9/46; G06F 9/48
USPC ......... 707/604, 605, 606, 792, 609, 608, 763, 707/757, 722, 748, 754, 713, 774, 758, 705, 707/737, 769, 770, 603, 802, 810, 811, 707/E17.44, E17.014, E17.015; 715/744, 715/216; 718/103; 719/318
See application file for complete search history.

(56) References Cited

U.S. PATENT DOCUMENTS

| | | | | |
|---|---|---|---|---|
| 7,720,803 B2* | 5/2010 | Unnebrink et al. | ........... | 707/601 |
| 7,908,281 B2* | 3/2011 | Marceau et al. | ........... | 707/751 |
| 7,953,722 B2* | 5/2011 | Tatzel et al. | ........... | 707/706 |
| 8,024,287 B2* | 9/2011 | Abouzied et al. | ........... | 707/603 |
| 8,219,521 B2* | 7/2012 | Lavdas et al. | ........... | 707/606 |
| 8,433,715 B1* | 4/2013 | Mirhaji | ........... | 707/756 |
| 2004/0162852 A1* | 8/2004 | Qu et al. | ........... | 707/104.1 |
| 2006/0112109 A1* | 5/2006 | Chowdhary et al. | ........... | 707/100 |
| 2009/0077094 A1* | 3/2009 | Bodain | ........... | 707/10 |
| 2009/0164414 A1* | 6/2009 | Tatzel et al. | ........... | 707/2 |
| 2010/0185700 A1* | 7/2010 | Bodain | ........... | 707/803 |
| 2010/0198778 A1* | 8/2010 | Venugopal et al. | ........... | 707/602 |
| 2010/0325142 A1* | 12/2010 | Anzalone et al. | ........... | 707/769 |
| 2011/0131250 A1* | 6/2011 | Stolte et al. | ........... | 707/802 |
| 2011/0320432 A1* | 12/2011 | Dewar et al. | ........... | 707/713 |
| 2012/0101860 A1* | 4/2012 | Ezzat | ........... | 705/7.11 |

(Continued)

OTHER PUBLICATIONS

Jossen, C. ; Credit Suisse AG, Zürich, Switzerland ; Blunschi, L. ; Mori, M. ; Kossmann, D.—"The Credit Suisse Meta-data Warehouse"—Published in: Data Engineering (ICDE), 2012 IEEE 28th International Conference on; Date of Conference: Apr. 1-5, 2012—pp. 1382-1393.*

(Continued)

*Primary Examiner* — Anh Ly
(74) *Attorney, Agent, or Firm* — Fountainhead Law Group PC

(57) ABSTRACT

Disclosed is a system allowing to query data warehouses using SPARQL. An aspect of the system may support the representation of multidimensional data as virtual graphs. Another aspect of the system may provide mapping of SPARQL queries directed against multidimensional data vis-à-vis the graphs to native queries directed against the multidimensional data. Responses from the native queries may then be translated to a SPARQL response format.

19 Claims, 11 Drawing Sheets

| productType | reviewCount |
|---|---|
| http://www4.wiwiss.fu-berlin.de/bizer/bsbm/v01/instances/ProductType101 | 236 |
| http://www4.wiwiss.fu-berlin.de/bizer/bsbm/v01/instances/ProductType45 | 207 |
| ... | ... |

116b

(56) References Cited

U.S. PATENT DOCUMENTS

| | | | | |
|---|---|---|---|---|
| 2012/0179644 A1* | 7/2012 | Miranker | | 707/605 |
| 2012/0303660 A1* | 11/2012 | Betzler et al. | | 707/769 |
| 2012/0310916 A1* | 12/2012 | Abadi et al. | | 707/713 |
| 2013/0067496 A1* | 3/2013 | Thollot et al. | | 719/318 |
| 2013/0124574 A1* | 5/2013 | Brettin et al. | | 707/798 |
| 2013/0173643 A1* | 7/2013 | Ezzat | | 707/756 |
| 2013/0246049 A1* | 9/2013 | Mirhaji | | 704/9 |
| 2013/0297660 A1* | 11/2013 | Yalamanchi et al. | | 707/812 |
| 2014/0149446 A1* | 5/2014 | Kuchmann-Beauger et al. | | 707/763 |
| 2014/0172780 A1* | 6/2014 | Senart et al. | | 707/605 |

OTHER PUBLICATIONS

Benedikt Kämpgen, and Andreas Harth: Karlsruhe Institute of Technology, Karlsruhe, Germany—"Transforming statistical linked data for use in OLAP systems"—Proceeding I-Semantics '11 Proceedings of the 7th International Conference on Semantic Systems—Sep. 7-9, 2011—pp. 33-40.*
DB2Triples. Internet article, retrieved from https://github.com/antidot/db2triples/, 2012. Printed on Oct. 3, 2012.
Linked Data—Connect Distributed Data across the Web. Internet article, retrieved from http://linkeddata.org/, 2012. Printed on Oct. 3, 2012.
RDF-RDB2RDF. Internet article, retrieved from https://metacpan.org/release/RDF-RDB2RDF, 2012. Printed on Oct. 3, 2012.
Triplify expose semantics! Internet article, retrieved from http://triplify.org/Overview, 2012. Printed on Oct. 3, 2012.
K. M. Albarrak and E. H. Sibley, "A survey of methods that transform data models into ontology models." In IEEE International Conference on Information Reuse and Integration, pp. 58-65, Aug. 2011.
I. Astrova, "Rules for mapping sql relational databases to owl ontologies." In Metadata and Semantics, pp. 415-424. Springer, 2009.
D. Beckett, and J. Broekstra, "SPARQL Query Results XML Format." Internet article, retrieved from http://www.w3.org/TR/rdf-sparql-XMLres/ Jan. 2008.
C. Bizer and A. Schultz, "Berlin SPARQL Benchmark (BSBM)—Business Intelligence Use Case 3.1", Internet article, retrieved from http://www4.wiwiss.fu-berlin.de/bizer/.BerlinSPARQLBenchmark/spec/BusinessIntelligenceUseCase/index.html, Jun. 2011.
L. M. Campbell and S. MacNeill, "The semantic web, linked and open data." JISC CETIS, Jun. 2010.
S. Chaudhuri. and U. Dayal., "An overview of data warehousing and OLAP technology." ACM SIGMOD, 26(1):65-74, Mar. 1997.
R. Cyganiak and C. Bizer, "Accessing Relational Databases as Virtual RDF Graphs." Internet article, retrieved from http://d2rq.org/, 2012. Printed on Oct. 10, 2012.
R. Cyganiak, D. Reynolds, and J. Tennison, The RDFData Cube Vocabulary. Internet article retrieved from http://www.w3.org/TR/vocab-data-cube/, Apr. 2012.
L. Etcheveryy and A. A. Vaisman, "Enhancing OLAP analysis with web cubes." In Extended Semantic Web Conference, pp. 469-483, 2012.
W. O.W. Group. Owl 2Web Ontology Language. Internet article, retrieved from http://www.w3.org/TR/owl2-overview/, Oct. 2009.
S. Hawke, I. Herman, and E. Prud'hommeaux, W3C Semantic Web Activity. Internet article, retrieved from http://www.w3.org/2001/sw/, Nov. 2011.
L. Etcheverry and A. A, Vaisman. QB4OLAP: A new vocabulary for OLAP cubes on the semantic web. In Third InternationalWorkshop on Consuming Linked Data (COLD2012), 2012.
B. Kampgen and A. Harth, "Transforming statistical linked data for use in OLAP systems." In 7th International Conference on Semantic Systems, Sep. 2011.
B. Kampgen, S. O'Riain, and A. Harth, "Interacting with statistical link data via OLAP operations." In InternationalWorkshop on Linked APIs for the Semantic Web, May 2012.
G. Klyne, J. J. Carroll, and B. McBride, Resource Description Framework (RDF): Concepts and Abstract Syntax. Internet article, retrieved from http://www.w3.org/TR/rdf-concepts/, 2004.
L. Lubyte and S. Tessaris. "Automatic extraction of ontologies wrapping relational data sources." In 20th International Conference on Database and Expert Systems Applications, pp. 128-142, 2009.
N. Prat, J. Akoka, and I. Comyn-Wattiau, "Transforming multidimensional models into OWL-DL ontologies." In Sixth International Conference on Research Challenges in Information Science, 2012.
E. Prud'hommeaux and A. Seaborne, "Sparol Query Language for RDF," Internet article, retrieved from http://www.w3.org/TR/rdf-sparql-query/, 2008.
P. E. Salas, M. Martin, F. M. D. Mota, K. Breitman, S. Auer, and M. A. Casanova, "Publishing statistical data on the web." In 6th International IEEE Conference on Semantic Computing, 2012.
J. F. Sequeda, R. Depena, and D. P. Miranker, "Ultrawrap Using SQL views for RDB2RDF", In Poster in the 8th International Semantic Web Conference, Sep. 2009.
O. Software. "Mapping Relational Data to RDF with Virtuoso's RDF Views." Internet article retrieved from http://virtuoso.openlinksw.com, 2012. Printed on Oct. 15, 2012.
D.-E. Spanos, P. Stravrou, and N. Mitrou, "Bringine relational databases into the semantic web: A survey." Semantic Web, 3(2):169-209, 2012.
R. Volz, S. Handschuh, S. Staab, L. Stojanovic, and N. Stojanovic, "Unveiling the hidden bride: Deep annotation for mapping and migrating legacy data to the semantic web." Web Semantics: Science, Services and Agents on the World Wide Web, 1(2), 2004.
R2RML: RDB to RDF Mapping Language. Internet article, retrieved from http://www.w3.org/TR/r2rml, 2012. Printed Oct. 16. 2012.

* cited by examiner

```
prefix bsbm: <http://www4.wiwiss.fu-berlin.de/bizer/bsbm/v01/vocabulary/>
prefix rev: <http://purl.org/stuff/rev#>

Select ?productType ?reviewCount
{
{ Select ?productType (count(?review) As ?reviewCount)
{
?productType a bsbm:ProductType .
?product a ?productType .
?product bsbm:producer ?producer .
?producer bsbm:country US .
?review bsbm:reviewFor ?product .
?review rev:reviewer ?reviewer .
?reviewer bsbm:country France .
}
Group By ?productType
}
}
Order By desc(?reviewCount) ?productType
Limit 10
```

Fig. 3C

```
PREFIX rdf:<http://www.w3.org/...rdf-syntax-ns#>
PREFIX qb:<http://purl.org/linked-data/cube#>
PREFIX rr:<http://www.w3.org/ns/r2rml#>
PREFIX onto:<http://data.example.com/ontology/>

<#table> a rr:LogicalTable;
        rr:sqlQuery """
        SELECT COUNT(review), reviewer, product,
        producer, productType, reviewer_country,
        producer_country
        FROM _SYS_BIC/my_package/Q1
        GROUP BY reviewer, product, productType,
        producer, reviewer_country,
        producer_country """ .
<#TriplesMap1>
    rr:logicalTable <#table>;
    rr:subjectMap [
        rr:template
        "http://data.example.com/Obs/
                    {reviewer}_{product}";
        rr:class qb:Observation;
    ];
    rr:predicateObjectMap [
        rr:predicate onto:review;
        rr:objectMap [ rr:column "review" ];
    ];
    rr:predicateObjectMap [
        rr:predicate onto:reviewer;
        rr:objectMap [ rr:template
        "http://data.example.com/Reviewers/
                    {reviewer}" ];
    ];
    rr:predicateObjectMap [
        rr:predicate onto:productType;
        rr:objectMap [ rr:template
        "http://data.example.com/ProductTypes/
                    {productType}" ];
    ];
    //...
.
<#TriplesMap2>
        rr:logicalTable <#table>;
    rr:subject onto:reviewer;
    rr:predicateObjectMap [
        rr:predicate rdf:type;
        rr:object qb:DimensionProperty;
    ] .
```

Fig. 3D

```
PREFIX rdf:<http://www.w3.org/1999/02/22-rdf-syntax-ns#>
PREFIX rdfs:<http://www.w3.org/2000/01/rdf-schema#>
PREFIX qb:<http://purl.org/linked-data/cube#>
PREFIX onto:<http://data.example.com/ontology/>
PREFIX inst:<http://data.example.com/> onto:review a qb:MeasureProperty .
onto:reviewer a qb:DimensionProperty .
onto:product a qb:DimensionProperty .
onto:productType a qb:DimensionProperty .
onto:producer a qb:DimensionProperty .
onto:producer_country a qb:DimensionProperty .
onto:reviewer_country a qb:DimensionProperty .

inst:datasets/Q1 a qb:dataset .

inst:Obs/101_29 a qb:Observation ;
    qb:dataset inst:Q1 ;
    onto:review inst:Reviews/42 ;
    onto:reviewer inst:Reviewers/101 ;
    onto:product inst:Products/29 ;
    ...
```

Fig. 3E

```
SELECT COUNT(review) reviewCount,
  ('http://www4.wiwiss.fu-berlin.de/bizer/bsbm/v01/instances/'
  || 'ProductType' || product_type) productType
FROM _SYS_BIC/my_package/Q1
WHERE reviewer_country='US'
  and producer_country = 'FR'
GROUP BY product_type
ORDER BY reviewCount DESC, productType
LIMIT 10
```

Fig. 3F

| productType | reviewCount |
|---|---|
| http://www4.wiwiss.fu-berlin.de/bizer/bsbm/v01/instances/ProductType101 | 236 |
| http://www4.wiwiss.fu-berlin.de/bizer/bsbm/v01/instances/ProductType45 | 207 |
| ... | ... |

Fig. 3G

```
<result>
<binding name="productType">
  <uri>
    http://www4.wiwiss.fu-berlin.de/bizer/bsbm/v01/instances/ProductType101
  </uri>
</binding>
<binding name="reviewCount">
  <literal datatype="http://www.w3.org/2001/XMLSchema#integer">236</literal>
</binding>
</result>
```

Fig. 3H

DATA WAREHOUSE QUERIES USING SPARQL

BACKGROUND

Unless otherwise indicated herein, the approaches described in this section are not prior art to the claims in this application and are not admitted to be prior art by inclusion in this section.

The development of the Semantic Web has put considerable focus on data and the relationships between data on the Web. In the vision of the Semantic Web, data should be shared and reused across application, enterprise, and community boundaries. Relationships among data on the Web should also be made available to create a Web of Data. In recent years, we have witnessed an explosion in the amount of interrelated data on the Web, also called Linked Data. For example, governments have launched major initiatives to publish a variety of public data in open and reusable formats. There are potential benefits for companies to augment their analytics and reporting tools with these datasets. It can provide them with greater insights. As a result, companies will ultimately make better business decisions and generally gain greater competitive advantage.

Nowadays, most large companies and governmental organizations rely on massive data warehouses to store the ever increasing volume of enterprise data that they have accumulated over the years. Multidimensional data stores provide indeed greater processing potential and complex data models facilitating advanced analysis. There is much work on mapping relational data to the Semantic Web. They typically reveal the structures encoded in relational databases by exposing their content as RDF Linked Data. By comparison, very little effort has been made to interface multidimensional data to the Semantic Web. Existing efforts either materialize Linked Data into data warehouses, or directly issue queries against triple stores using non-standardized vocabularies.

BRIEF DESCRIPTION OF THE DRAWINGS

FIGS. 3A-3H illustrate an example of processing a query against a multidimensional database according to principles of the present disclosure.

DETAILED DESCRIPTION

Figure 1:
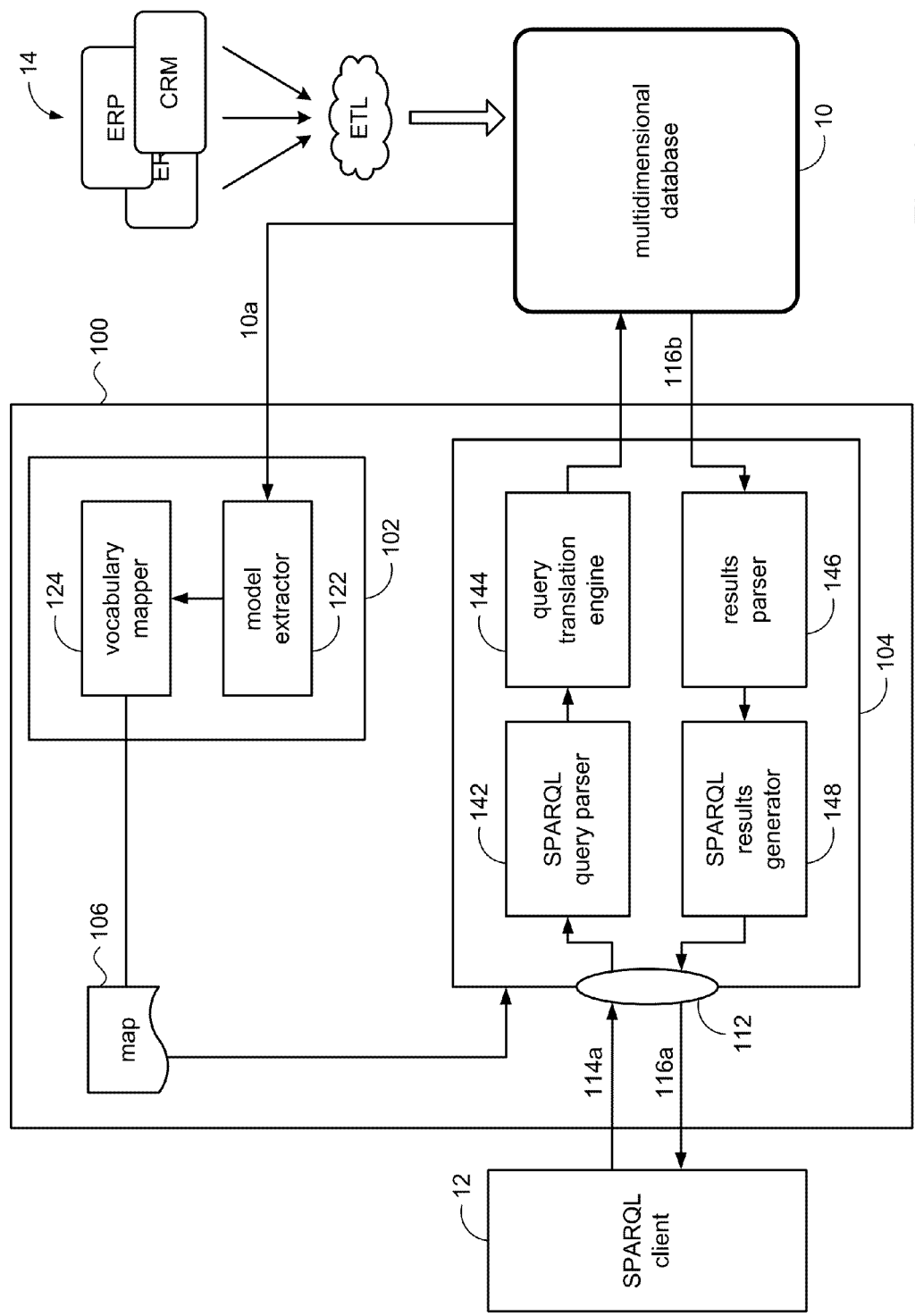
FIG. 1 is a high level block diagram of a system in accordance with the present disclosure.

Referring to FIG. 1, in accordance with the present disclosure, a query mapping system 100 may provide a client 12 access to a multidimensional database 10 using the SPARQL Protocol and RDF Query Language (SPARQL). The resource description framework (RDF) is a way of expressing the properties of items of data using triples (3-tuple) in the form of subject-predicate-object. Two related items of data may be denoted as the subject and the object. The predicate denotes traits or aspects of the data and expresses a relationship between a subject and an object. For example, the notion "John works in France" may be expressed in RDF by denoting "John" as the subject, denoting "works in" as the predicate, and "France" as the object.

In some embodiments, the client 12 may be a user accessing web services (e.g., via a web browser) that provide access to the multidimensional database 10 using the query mapping system 100. The client 12 may input SPARQL queries against the multidimensional database 10.

In some embodiments, the multidimensional database 10 may implement a data warehouse for OnLine Analytical Processing (OLAP). A data warehouse is a database that is specialized in storing and analyzing large amounts of data. An enterprise may deploy a data warehouse to store and analyze the vast amounts of data that they accumulate over the years. Typically, data in the data warehouse can come from different operational systems 14 within the enterprise, for example, a Customer Relationship Management (CRM) system, Enterprise Resource Planning (ERP) system(s), etc. The operational systems 14 typically keep only fresh data (e.g., data is collected and replaced daily, monthly, etc.), while the data warehouse collects and accumulates the data from the operational systems as historical data. Data from the different operational systems 14 come in various forms, and so they typically need to be processed before being moved to the warehouse. This process is referred to as Extract, Transform, and Load (ETL) processing.

The multidimensional database 10 represents data using a dimensional data model, which is characterized by the use of "data cubes" to represent the dimensions of data available to a user. For example, "sales revenue" could be viewed as a function of product model (different product models have different sales prices), geography (sale price may vary according to where the product is sold), time (sale price may depend on when the product is sold, e.g., during the holidays vs. off-holiday sales), and so on. In this case, "sales revenue" is known as the measure attribute of the data cube and the product model, geography, and time are known as the dimension attributes of the data cube. It can be appreciated that a measure may be a function of fewer than three or more than three dimensions, and so the more abstract term of "data hypercube" may be used. There is no formal way of deciding which attributes should be made dimensions and which attributes should be made measures. Such decisions are specific to the data being modeled, who will use the data model, how the data model will be used, and so on, and thus are made during the specification and design phases of the database.

Dimensions may be associated with hierarchies that specify aggregation levels, and hence granularity in how the data may be viewed. For example, a "date" dimension in a data cube may have the following hierarchy: day→month→quarter→year. Similarly, a "location" dimension in the data cube may have the following hierarchy: city→county→state→country→continent.

As explained above, the multidimensional database 10 is characterized in that the multidimensional database represents data using a dimensional data model paradigm. In terms of specific embodiments, the multidimensional database 10 may be implemented using any suitable database design. For example, the multidimensional database 10 may be based on the star schema, where the measure attribute may be derived from the fact table component of the star schema and the dimension attributes may be derived from the dimension tables component of the star schema. In other examples, the multidimensional database 10 may be based on the snowflake schema, and so on. The underlying database technology may be any suitable technology. For example, in some embodiments, the multidimensional database 10 may be built on a relational database using Structured Query Language (SQL) as its native query language. In other embodiments, an OLAP type database using the Multidimensional Expressions (MDX) language may be the underlying database technology. In still other embodiments, the underlying database may support several query languages natively. For example, in some embodiments, the multidimensional database 10 may support Structured Query Language (SQL). In other embodiments, the multidimensional database 10 may support both SQL and MDX.

Continuing with FIG. 1, the query mapping system 100 may comprise a mapping generator 102 and a query translator 104. The mapping generator 102 may automatically extract information from metadata comprising the multidimensional database 10 to create a mapping 106. The mapping generator 102 may comprise model extractor 122 and a vocabulary mapper 124.

The query translator 104 may interpret the mapping 106 to translate SPARQL queries 114a received from client 12 into a native query 114b that is expressed in the native query language of the multidimensional database 10. For example, if the underlying database of the multidimensional database 10 is a relational database, then the native query language may be a form of SQL. The query translator 104 may comprise a query parser 142 and a query translation engine 144 to direct a SPARQL query 114a received from the client 12 against the multidimensional database 10 in the form of native query 114b. The query translator 104 may further comprise a results parser 146 and a results generator 148 to provide responses 116b from the multidimensional database 10 and provide them to the client 12 in the form of a SPARQL response 116a.

A SPARQL endpoint 112 may provide an interface to the query mapping system 100. The SPARQL endpoint 112 may receive SPARQL queries 114a from the client 12 and provide SPARQL responses 116a to the client via the HyperText Transport Protocol (HTTP). In some embodiments, the SPARQL endpoint 112 may enable clients to execute SPARQL queries against an RDF dataset.

An observation worth noting is that there is no duplication of the actual data that is stored in the multidimensional database 10. For example, the mapping 106 that is generated using the metadata describes the structure (e.g., table names of fact and dimension tables, data field names, data types, and so on) of the multidimensional database 10, but does not otherwise include the actual data that are stored by the multidimensional database. As will be explained below, the mapping 106 is used to translate the SPARQL query 114a to produce a native query 114b that is executed against the multidimensional database 10. By virtue of generating native query 114b, the query mapping system 100 avoids the need to duplicate the data stored in the multidimensional database since the native query is being executed against the multidimensional database itself.

Figure 2A:
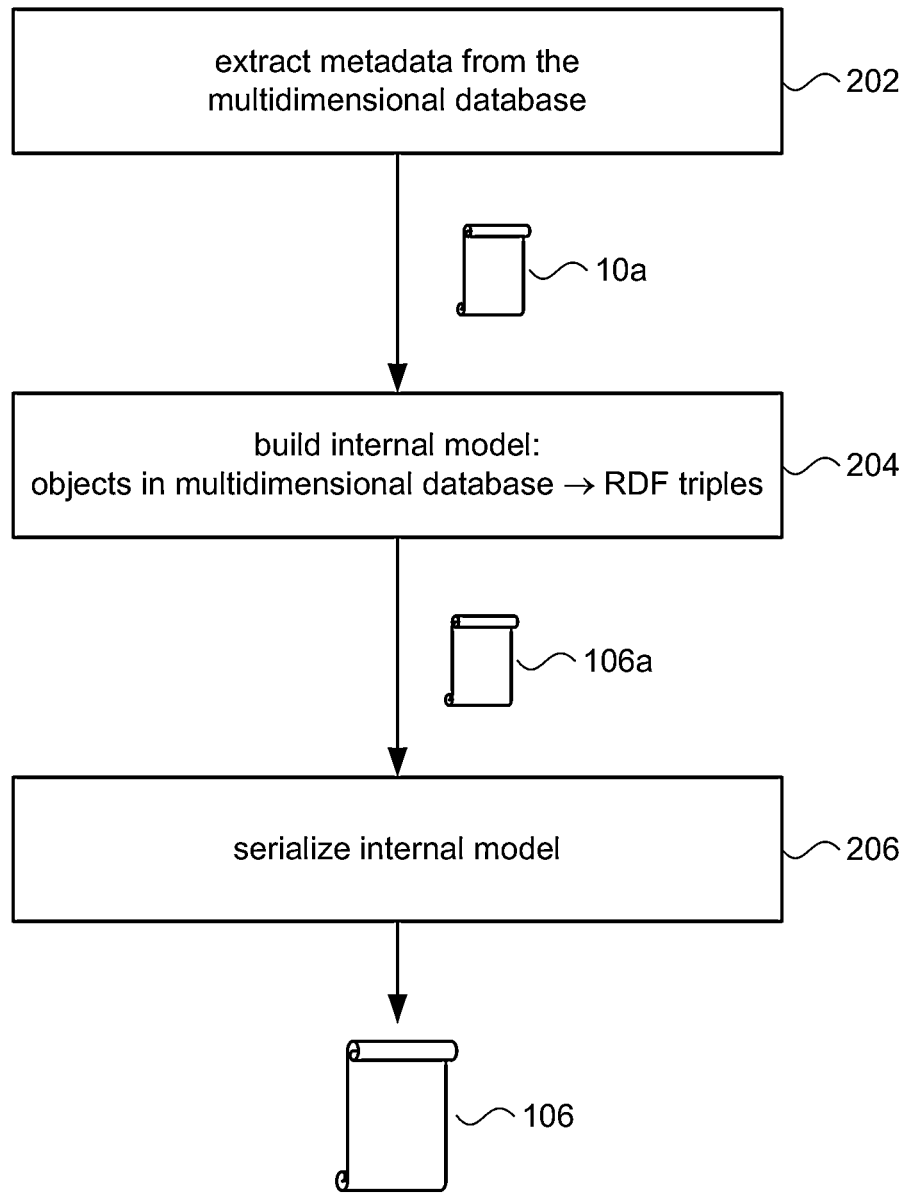
FIG. 2A illustrates a workflow for generating a mapping.
Figure 2B:
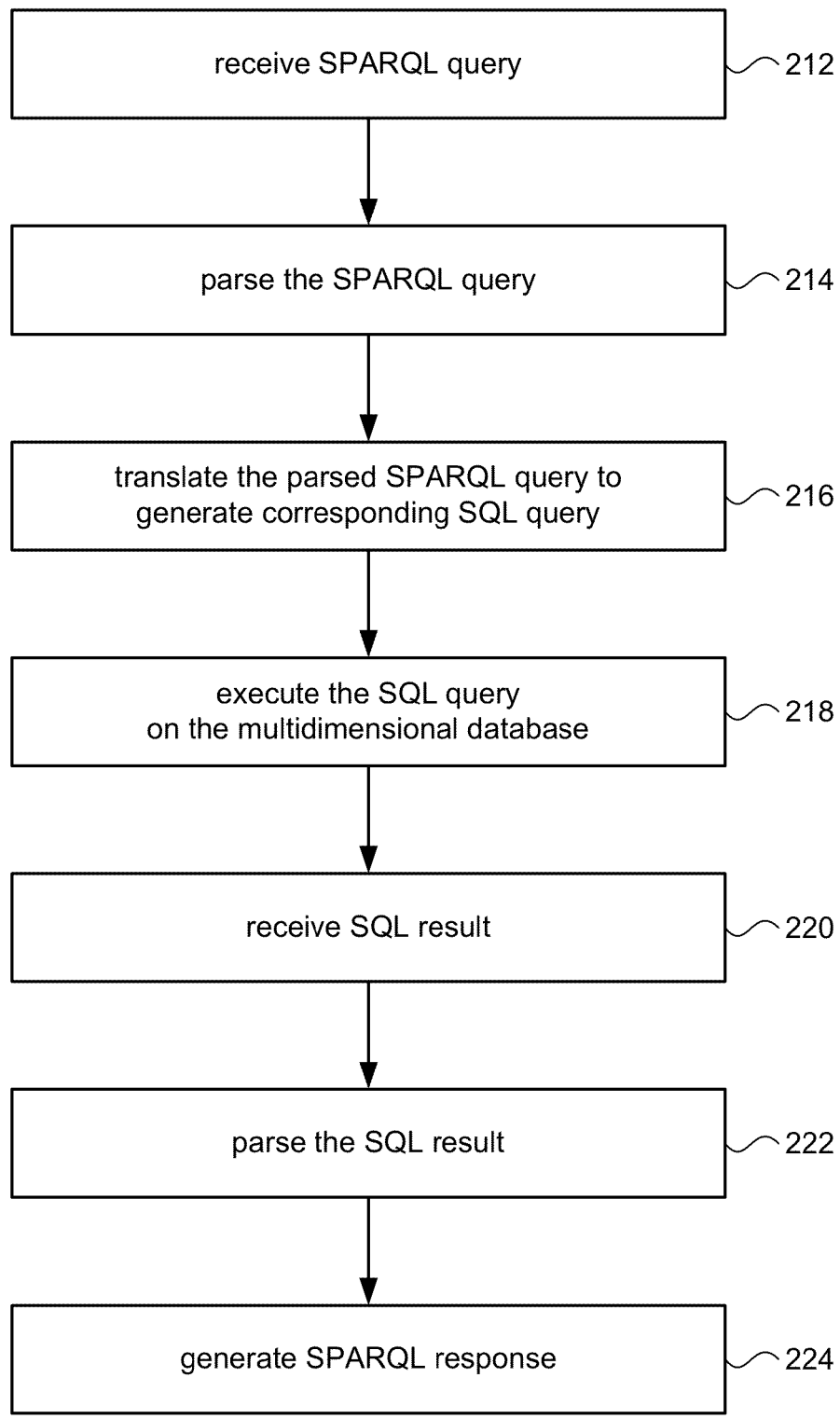
FIG. 2B illustrates a workflow for processing a SPARQL query in accordance with the present disclosure.

The discussion will now turn to a description of a workflow in the mapping generator 102 and the query translator 104 in accordance with principles of the present disclosure. FIGS. 2A and 2B illustrate workflows in accordance with some embodiments. The workflow will be explained in the context of an illustrative example shown in FIGS. 3A-3H.

Figure 3A:
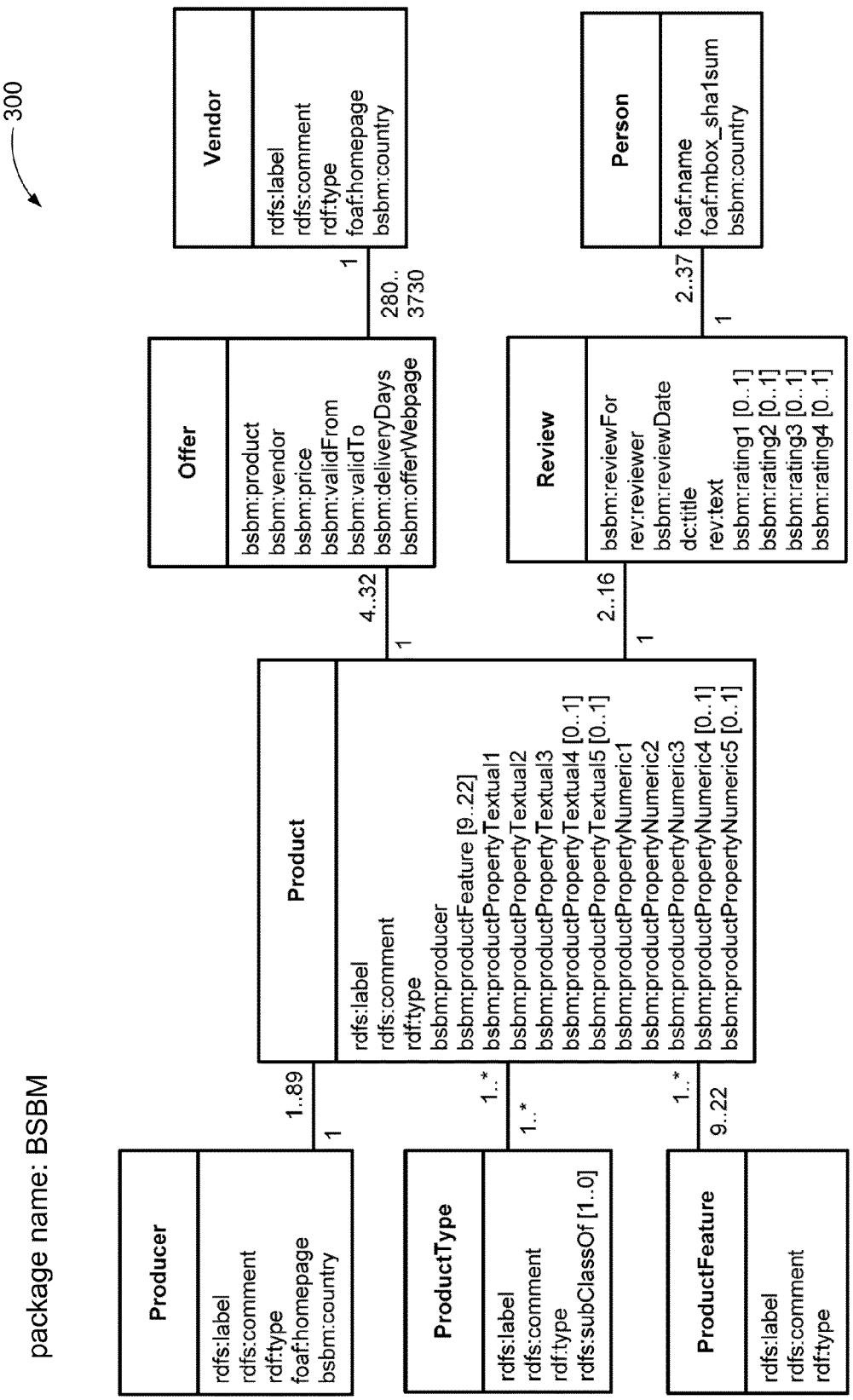

Referring to FIG. 3A, an example is based on the Business Intelligence Use Case of the Berlin SPARQL Benchmark (BSBM), expressed as a relational schema. The Business Intelligence Use Case uses a dataset 300 that is built around an e-commerce scenario, where a set of products is offered by different vendors and different consumers have posted reviews about products. The dataset 300 contains information about products, their producers, their reviews, and the corresponding reviewers.

Figure 3B:
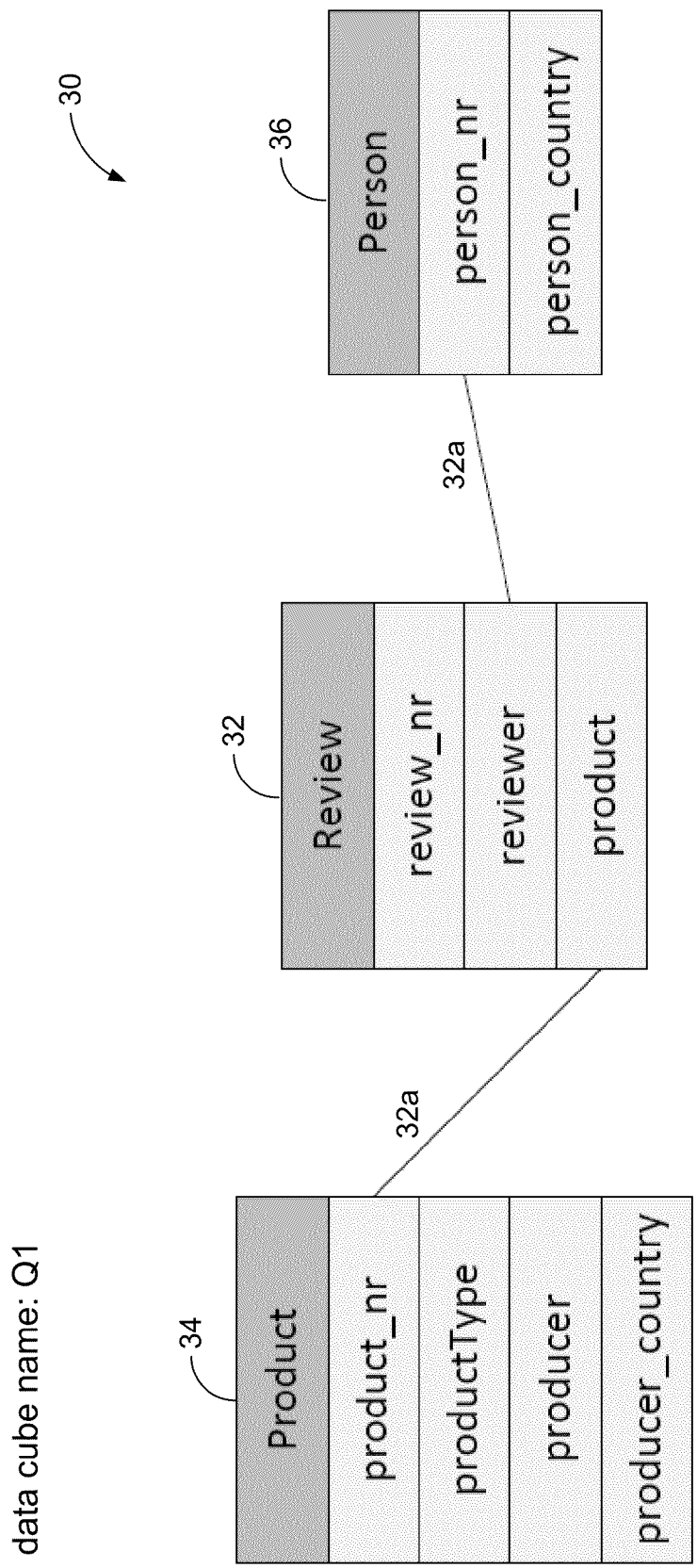

FIG. 3B shows a multidimensional database 30 that can be built from the BSBM dataset 300. The multidimensional database 30 is configured as a star schema and comprises a fact table 32 containing a measure review_nr, and links 32a to dimension tables 34, 36. The Product dimension table 34 and Person dimension table 34 are two shared dimensions that consist of a subset of columns of interest from different tables of the dataset 300 and define the join between the tables. It is noted that the dataset 300 is not part of the multidimensional database 30. The dataset 300 was used merely as a convenient source of data for building the multidimensional database 30 for testing purposes, but is not otherwise an aspect of the present disclosure.

FIG. 3C illustrates an example of a query 114a, expressed in SPARQL, that the SPARQL client 12 may issue. The query 114a may be executed against the multidimensional database 30, which searches for the top ten most discussed French product types in the U.S. based on the number of reviews in France.

Referring now to FIGS. 2A, 3A, and 3B, in some embodiments, the mapping generator 102 may perform in accordance with the following workflow. As there are many implementations of multidimensional databases, a common representation may be used. Accordingly, at block 202, the model extractor 122 may communicate with the multidimensional database 30 to extract metadata from the multidimensional database and from the dataset 300, such as names of the columns and their roles as dimension or measure. The metadata may be stored in an internal model 106a. The metadata may describe various database objects comprising the multidimensional database 30 and dataset 300. As explained above, the metadata which describes the multidimensional database 30 should not be confused with the data that is stored in the multidimensional database. The term "metadata", in the context of the database arts, is a commonly used term in the database arts, and is well understood by those of ordinary skill in the database arts as referring to data that describes the structure and organization of a database such as multidimensional database 30. For example, the database objects (i.e., structure and organization) of the multidimensional database 30 may include dimensions of a data cube, measures of the data cube, schema names, table names, column names, their attributes (e.g., integer, text, data size, etc.), and so on, depending on the particular implementation of the multidimensional database. In terms of the examples shown in FIGS. 3A and 3B, the metadata include review_nr, reviewer, product, person_nr, person_country, product_nr, productType, producer, and producer_country.

At block 204, the model extractor 122 may build an internal model 106a of the multidimensional database 30 using metadata extracted from the multidimensional database. The internal model 106a may model data objects comprising the multidimensional database 30. In an embodiment, for example, the internal model 106a may be expressed using RDF to represent the correspondence between database objects comprising the multidimensional database 30 and RDF triples that represent those database objects. The internal model 106a may include the following, for example:
  A reference to identify the source of the data (e.g., dataset 300 and multidimensional database 30).
  A list of measures with their name, URI (built from package name, cube name and column name).
  A list of dimensions with their name, URI (built from package name, cube name and column name).
In the example in FIGS. 3A and 3B, the following metadata may be used:
  Datasetref: BSBM, Q1

Measures: review_nr

Dimensions: person_nr, person_country, product_nr, productType, producer, and producer_country It will be appreciated that the model extractor 122 may be specific to each database implementation, and that each implementation may require its own model extractor.

In accordance with the present disclosure, the mappings model 106 specifies how the entities of each cube, e.g., axis for dimensions and attributes, and cell type for measures, are mapped to RDF classes and properties. Subsequently, mapping model also specifies how values from the multidimensional dataset, e.g., cube cells, will be mapped to RDF observations by the query translator at query time. Since observations comply to the <subject, predicate, object> triple model, the mapping generator 102 will typically map the fact table values to subjects in the observations, generate predicate mappings with resource as object for proper dimensions, and predicate mappings with literal as object for flattened attributes (in the above example producer_country or person_country). Subsequently, at query time the query translator 104 will produce one observation for each tuple in the fact table, references to other resources for dimensions values (axis position of the cube cell) and literal values for flattened attributes (either of the current fact or of an arbitrary dimension).

At block 206, the vocabulary mapper 124 may serialize the internal model 106a in a mapping language with a target vocabulary. In some embodiments, the mapping language may be R2RML or D2RQ Mapping Language, for example. FIG. 3D illustrates an example showing a portion of an R2RML mapping that may be generated for the query 114a. For the multidimensional data itself, the target vocabularies may be the RDF Data Cube Vocabulary (QB), the Open Cube Vocabulary (OC), or QB4OLAP, for example. The result is the mapping 106, which may be stored in a suitable datastore (not shown) that can be accessed by the query translator 104. FIG. 3E illustrates an example of a portion of mapping 106 generated from the R2RML mapping of FIG. 3D. As will be explained in connection with FIG. 2B, the mapping 106 will be used at query time to produce SPARQL results.

Referring now to FIGS. 2B and 3C-3H, in some embodiments, the query translator 104 may perform in accordance with the following workflow. At block 212, the endpoint 112 may receive a query 114a from client 12. As illustrated in FIG. 1, the query 114a may be expressed in SPARQL, an example of which is shown in FIG. 3C.

At block 214, the query parser 142 may parse the query 114a to verify for proper syntax. In an embodiment, for example, the query parser 142 may implement the SPARQL 1.1 syntax.

If the query 114a has proper syntax, then the query parser 142 may pass the query to the translation engine 144. Thus, at block 216, the translation engine 144 may use the mapping 106 to translate the query 114a to produce a corresponding query 114b that is expressed in the native language (e.g., SQL, MDX, etc.) of the multidimensional database 30. FIG. 3F illustrates an example of SQL query 114b obtained by translating the SPARQL query 114a in accordance with principles of the present disclosure.

At block 218, the translation engine 144 may execute the query 114b against the multidimensional database 10, for example, by sending the query 114b to the multidimensional database. In accordance with principles of the present disclosure, the SPARQL query 114a is not issued on the multidimensional database 30. In fact, there is no database against which the SPARQL query is executed. Instead, a native query 114b that corresponds to the SPARQL query 114a is generated and issued on the multidimensional database 10 to obtain the information that is requested in the SPARQL query.

At block 220, the multidimensional database 10 may produce a result 116b in response to the query 114b. A at block 222, the results parser 146 may receive the result 116b and parse the results to identify the syntactic elements in the results 116b. FIG. 3F illustrates an example of results 116b. FIG. 3G illustrates an example of result 116b.

At block 224, the results translator 148 may receive the parsed results from the results parser 220 and translate the parsed results in a SPARQL format to produce SPARQL results 116a. For example, the SPARQL results 116a may be expressed in a machine-processable format such as an XML-based SPARQL Results Document, using JavaScript Object Notation (JSON), or in a comma-separated values (CSV) format, a tab-separated values (TSV) format, a serialized RDF graph, and so on. FIG. 3H illustrates an example of SPARQL results 116a.

Figure 4:
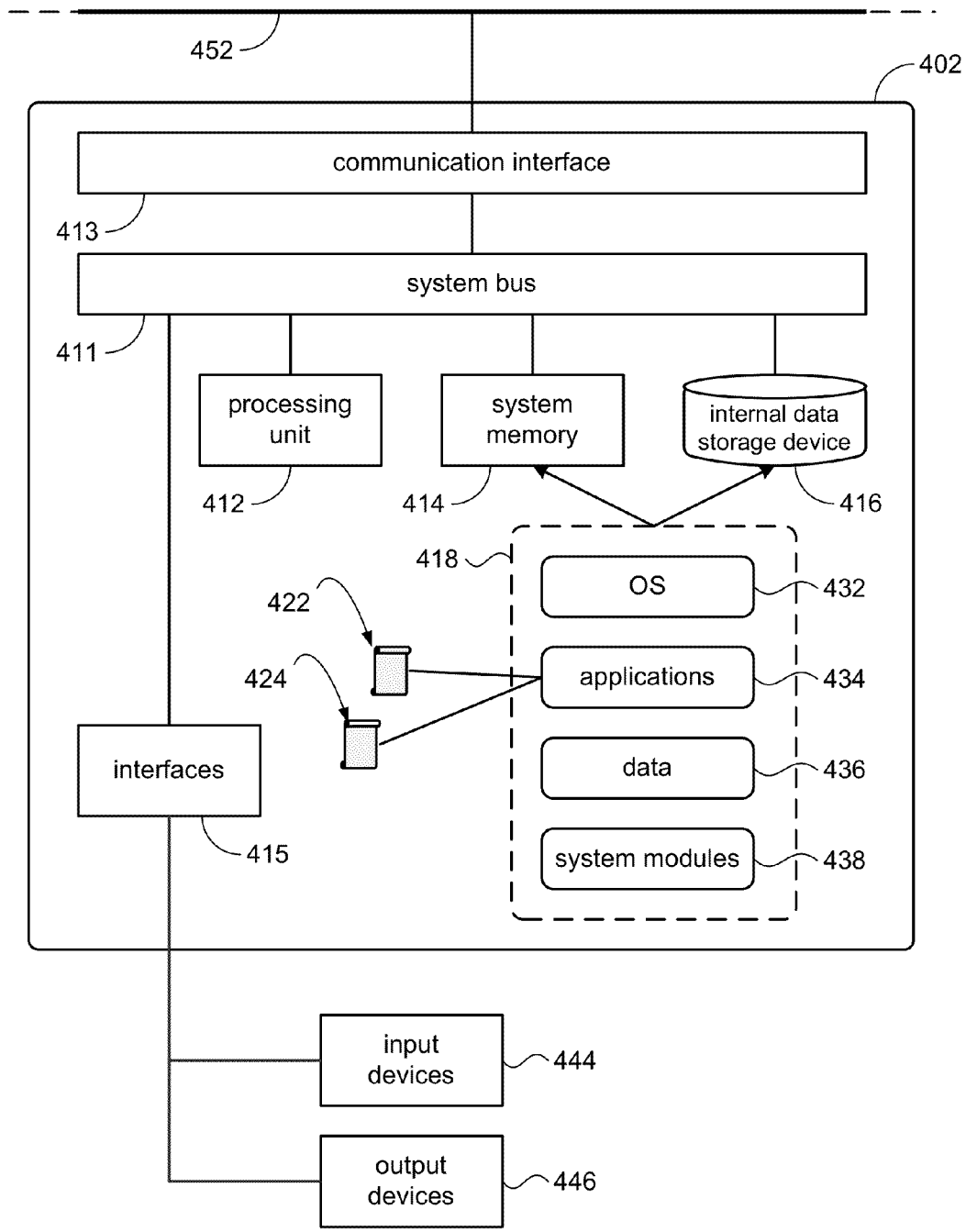
FIG. 4 shows an illustrative implementation in accordance with the present disclosure.

Referring to FIG. 4, an illustrative implementation of the query mapping system 100 may include a computer system 402 having a processing unit 412, a system memory 414, and a system bus 411. The system bus 411 may connect various system components including, but not limited to, the processing unit 412, the system memory 414, an internal data storage device 416, and a communication interface 413.

The processing unit 412 may comprise a single-processor configuration, or may be a multi-processor architecture. The system memory 414 may include read-only memory (ROM) and random access memory (RAM). The internal data storage device 416 may be an internal hard disk drive (HDD), a magnetic floppy disk drive (FDD, e.g., to read from or write to a removable diskette), an optical disk drive 1020 (e.g., for reading a CD-ROM disk, or to read from or write to other high capacity optical media such as the DVD, and so on). In a configuration where the computer system 402 is a mobile device, the internal data storage 416 may be a flash drive.

The internal data storage device 416 and its associated non-transitory computer-readable media provide nonvolatile storage of data, data structures, computer-executable instructions, and so forth. Although the description of computer-readable media above refers to a HDD, a removable magnetic diskette, and a removable optical media such as a CD or DVD, it is noted that other types of media which are readable by a computer, such as zip drives, magnetic cassettes, flash memory cards, cartridges, and the like, may also be used, and further, that any such media may contain computer-executable instructions for performing the methods disclosed herein.

The system memory 414 and/or the internal data storage device 416 may store a number of program modules, including an operating system 432, one or more application programs 434, program data 436, and other program/system modules 438. Application program 422 may comprise the mapping generator 102 and application 424 may comprise the query translator 104. For example, in a specific embodiment, the multidimensional database 10 is the SAP HANA® DB product and objects (e.g., multidimensional models) in the multidimensional database include Attribute Views and Analytic Views, and the query language is SQL. The application program 424 may be implemented in Java, using HANA's JDBC driver, as well as the HANA Modeler System Developer Kit (SDK). The SDK is a Java library enabling creation and modification of HANA Views. HANA's Attribute and Analytic Views provide a high-level interface for the data of interest, so the SQL queries to be generated are relatively simple, although the calculations are complex. Indeed, a query of the form SELECT* over an Analytic View reveals that the View can be seen as a simple SQL View, with some limitations but higher performance. The Modeler SDK provides the extraction of the metadata from the multidimensional database 10 needed to create the mapping 106, namely the names of the virtual columns in the Views, their roles as a dimension or a measure, and so on.

Access to the computer system 402 may be provided by a suitable input device 444 (e.g., keyboard, mouse, touch pad, etc.) and a suitable output device 446, (e.g., display screen). In a configuration where the computer system 402 is a mobile device, input and output may be provided by a touch sensitive display.

The computer system 402 may operate in a networked environment using logical connections via wired and/or wireless communications to one or more remote computers (not shown) over a communication network 452. The communication network 452 may be a local area network (LAN) and/or larger networks, such as a wide area network (WAN).

The above description illustrates various embodiments of the present invention along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A computer-implemented method for querying a multidimensional database configured according to a dimensional model, the method comprising:
   at a computing device having one or more processors and memory storing one or more programs for execution by the one or more processors:
   receiving a Simple Protocol And Resource Description Framework Query Language (SPARQL) query having one or more query parameters on the multidimensional database comprising references to one or more fact tables and one or more dimension tables in the multidimensional database, the multidimensional database having one or more native query languages to access the multidimensional database, none of which are SPARQL;
   generating a native query from the SPARQL query using a mapping file comprising metadata that describes the multidimensional database, including:
      automatically mapping one or more columns in the multidimensional database to the one or more query parameters in the SPARQL query; wherein
      the mapping is serialized with a target vocabulary; and
      the target vocabulary includes one of: a R2RML vocabulary, a D2RQ vocabulary, or a QB4OLAP vocabulary;
      wherein the native query is expressed in one of the native query languages of the multidimensional database;
   executing the native query on the multidimensional database;
   receiving a native result comprising data stored in the multidimensional database resulting from execution of the native query against the multidimensional database; and
   generating a SPARQL result from the native result using the mapping file, the SPARQL result representing a response to the SPARQL query.

2. The method of claim 1 wherein the multidimensional database is a data warehouse, the native query language is Structured Query Language (SQL), and the native query is expressed in SQL.

3. The method of claim 1 wherein the multidimensional database is organized in a star schema.

4. The method of claim 1 wherein the multidimensional database is organized in a snowflake schema.

5. The method of claim 1 wherein the native result further comprises one or more aggregations of data stored in the multidimensional database that was retrieved in response to the native query.

6. The method of claim 1 further comprising generating the mapping file including:
   extracting from the multidimensional database the metadata that describes the multidimensional database; and
   generating from the metadata correspondences between objects of the multidimensional database and Resource Description Framework (RDF) triples that represent the objects of the multidimensional database.

7. The method of claim 1 wherein the native query is expressed as an Multidimensional Expressions (MDX) query.

8. The method of claim 1, wherein the mapping includes:
   mapping a first RDF class specified in the SPARKQLE query with a first column in the multidimensional database; and
   mapping a first property corresponding to the first RDF class specified in the SPARQLE query with first values corresponding to the first column in the multidimensional database.

9. A database query system comprising:
   a processor; and
   a data storage device having stored thereon computer executable program code, which, when executed by the processor, causes the processor to:
   receive a SPARQL query having one or more query parameters on the multidimensional database comprising references to one or more fact tables and one or more dimension tables in the multidimensional database, the multidimensional database having one or more native query languages to access the multidimensional database, none of which are SPARQL;
   generate a native query from the SPARQL query using a mapping file comprising metadata that describes the multidimensional database, including:
      automatically mapping one or more columns in the multidimensional database to the one or more query parameters in the SPARQL query; wherein
      the mapping is serialized with a target vocabulary; and
      the target vocabulary includes one of: a R2RML vocabulary, a D2RQ vocabulary, or a QB4OLAP vocabulary;
      wherein the native query is expressed in one of the native query languages of the multidimensional database;
   execute the native query on the multidimensional database;
   receive a native result comprising data stored in the multidimensional database resulting from execution of the native query against the multidimensional database; and
   generate a SPARQL result from the native result using the mapping file, the SPARQL result representing a response to the SPARQL query.

10. The system of claim 9 wherein the multidimensional database is a data warehouse, the native query language is Structured Query Language (SQL), and the native query is expressed in SQL.

11. The system of claim 9 wherein the multidimensional database is organized in a star schema or a snowflake schema.

12. The system of claim 9 wherein the native result further comprises one or more aggregations of data stored in the multidimensional database that was retrieved in response to the native query.

13. The system of claim 9 wherein the computer executable program code, which, when executed by the processor, further causes the processor to:
  extract from the multidimensional database the metadata that describes the multidimensional database; and
  generate from the metadata correspondences between objects of the multidimensional database and Resource Description Framework (RDF) triples that represent the objects of the multidimensional database.

14. The system of claim 9 wherein the native query is expressed as an Multidimensional Expressions (MDX) query.

15. A non-transitory computer-readable storage medium having stored thereon computer executable program code, which, when executed by a computer, causes the computer to:
  receive a SPARQL query having one or more query parameters on the multidimensional database comprising references to one or more fact tables and one or more dimension tables in the multidimensional database, the multidimensional database having one or more native query languages to access the multidimensional database, none of which are SPARQL;
  generate a native query from the SPARQL query using a mapping file comprising metadata that describes the multidimensional database, including:
    automatically mapping one or more columns in the multidimensional database to the one or more query parameters in the SPARQL query; wherein
    the mapping is serialized with a target vocabulary; and
    the target vocabulary includes one of: a R2RML vocabulary, a D2RQ vocabulary, or a QB4OLAP vocabulary;
  wherein the native query is expressed in one of the native query languages of the multidimensional database;
  execute the native query on the multidimensional database;
  receive a native result comprising data stored in the multidimensional database resulting from execution of the native query against the multidimensional database; and
  generate a SPARQL result from the native result using the mapping file, the SPARQL result representing a response to the SPARQL query.

16. The non-transitory computer-readable storage medium of claim 15 wherein the multidimensional database is a data warehouse, the native query language is Structured Query Language (SQL), and the native query is expressed in SQL.

17. The non-transitory computer-readable storage medium of claim 15 wherein the multidimensional database is organized in a star schema or a snowflake schema.

18. The non-transitory computer-readable storage medium of claim 15 wherein the native result further comprises one or more aggregations of data stored in the multidimensional database that was retrieved in response to the native query.

19. The non-transitory computer-readable storage medium of claim 15 wherein the computer executable program code, which, when executed by the computer, further causes the computer to:
  extract from the multidimensional database the metadata that describes the multidimensional database; and
  generate from the metadata correspondences between objects of the multidimensional database and Resource Description Framework (RDFS triples that represent the objects of the multidimensional database.

* * * * *